(No Model.) 2 Sheets—Sheet 1.
G. HILL.
VALVE FOR RADIATORS OR OTHER HEATING APPARATUS.
No. 468,874. Patented Feb. 16, 1892.
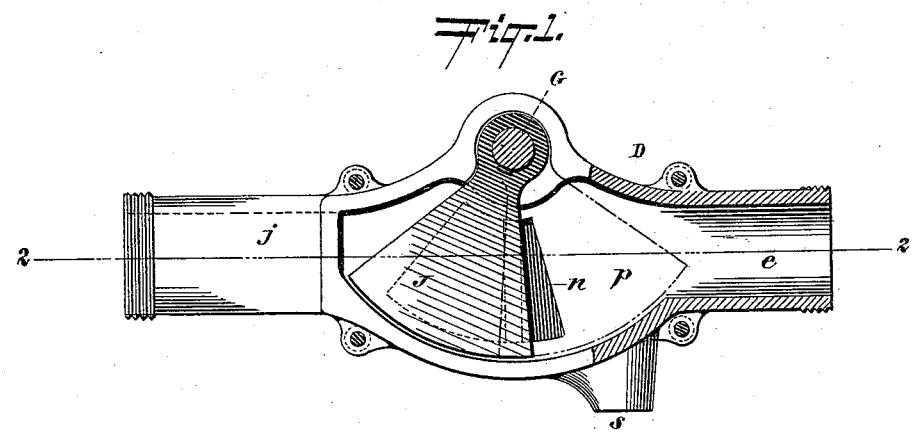
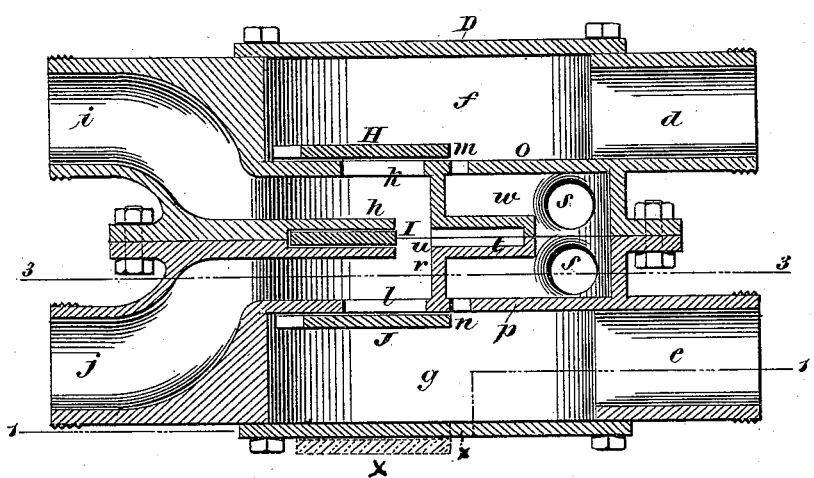
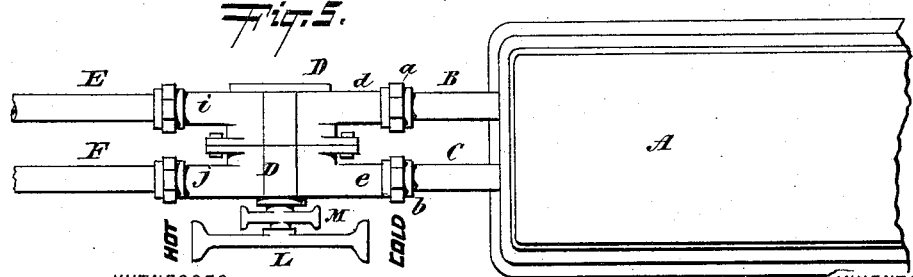
WITNESSES:
INVENTOR
George Hill,
BY Briesen & Knauth
his ATTORNEYS.

(No Model.) 2 Sheets—Sheet 2.
G. HILL.
VALVE FOR RADIATORS OR OTHER HEATING APPARATUS.
No. 468,874. Patented Feb. 16, 1892.
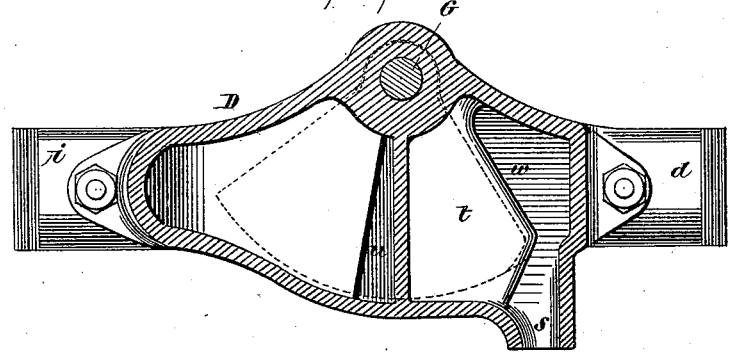
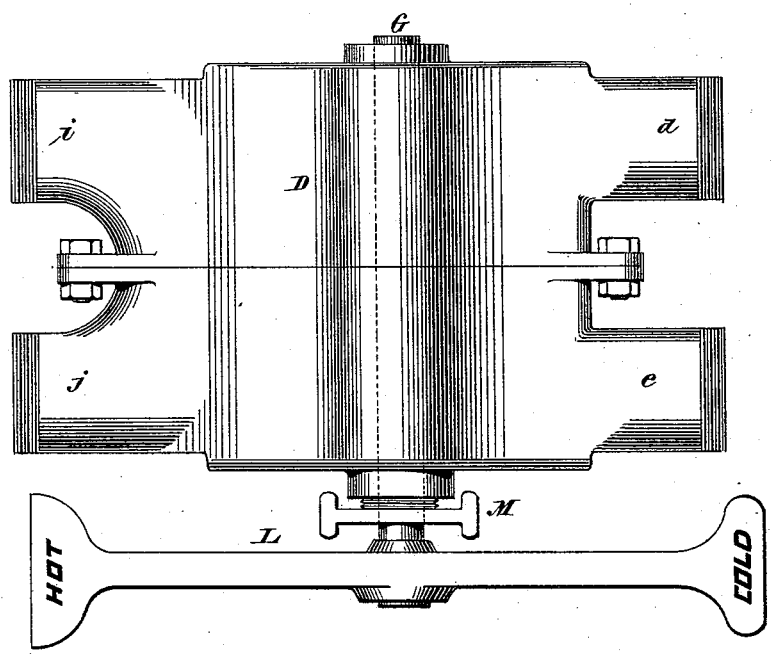

UNITED STATES PATENT OFFICE.

GEORGE HILL, OF NEW BRUNSWICK, NEW JERSEY.

VALVE FOR RADIATORS OR OTHER HEATING APPARATUS.

SPECIFICATION forming part of Letters Patent No. 468,874, dated February 16, 1892.

Application filed October 6, 1891. Serial No. 407,848. (No model.)

*To all whom it may concern:*

Be it known that I, GEORGE HILL, a resident of New Brunswick, Middlesex county, New Jersey, have invented certain new and useful Improvements in Valves for Radiators and other Heating Apparatus, of which the following is a specification.

The object of this invention is so to construct the valve mechanism of radiators or similar heating apparatus that the water or other heating-liquid can be made to pass through such radiator as ordinarily, but that when no heat is required the connection between the inlet and outlet pipes leading to and from such radiator will be made direct and the radiator itself emptied of any remaining liquid, so as to prevent freezing and other annoyances.

In ordinary heating apparatus, as far as known to me, where, for example, hot water is used as the heating medium, valves are provided for admitting more or less of this hot water to the radiator and other valves for regulating the outlet; but once the hot water is turned off and the outlet turned off the radiator still remains full of water, which may freeze, and thereby cause great damage; but ordinarily, however, the inlet-pipe only is shut off, in which case the radiator remains in communication with the outlet-pipe and giving rise to further annoyances, such as creation of partial vacuum, the corresponding noises, &c., all of which objections my invention is intended to overcome.

Mainly my invention consists in the employment of a three-leaf valve at the intersection of the inlet and outlet pipes with the valve-chambers that communicate with the pipes of the heater or radiator.

The invention also consists in other details of improvement that will be hereinafter more fully described.

In the accompanying drawings, Figure 1 represents a side view, partly in section, of my improved valve mechanism, the line 1 1 in Fig. 2 indicating the plane of section. Fig. 2 is a horizontal section of the valve mechanism and valves, showing the latter in the position of shutting the water off the radiator, the line 2 2 in Fig. 1 indicating the plane of section. Fig. 3 is a vertical section on the line 3 3, Fig. 2. Fig. 4 is a plan or top view of the whole mechanism on the same scale as the figures hereinabove mentioned, while Fig. 5 is a plan view, on a reduced scale, of the same mechanism and of a portion of a radiator connected therewith.

The letter A, referring to Fig. 5, represents the radiator, the letter B the inlet-pipe for supplying said radiator with the heating medium, and the letter C the outlet-pipe from said radiator. When I say "radiator" in this specification, I mean any suitable heater adapted to receive a fluid heating medium, which may be either steam, hot water, or any other substance. The pipes B and C communicate by couplings $a$ $b$, or directly, if desired, with nipples $d$ $e$, respectively, that project from the valve-box D. This valve-box contains four principal compartments, which are lettered in Fig. 2, respectively, $f$ $g$ $h$ $w$. The compartment $f$ always communicates with the nipple $d$, while the compartment $g$ always communicates with the nipple $e$. The compartment $h$, however, always communicates with nipples $i$ and $j$, that project from the valve-box D and that are coupled or otherwise connected to the main inlet-pipe E and main outlet-pipe F, as shown in Fig. 5. The chamber $f$ of the valve-box D communicates by an opening $k$ with the chamber $h$. The chamber $g$ of the valve-box communicates by an opening $l$ with the chamber $h$. The chamber $f$ communicates by another aperture $m$ with the chamber $w$. The chamber $g$ communicates by an aperture $n$ with the chamber $w$. The apertures $k$ and $m$ are contained in a partition $o$, which separates the chamber $f$ from the two chambers $h$ and $w$. The apertures $l$ and $n$ are contained in a partition $p$, which separates the chamber $g$ from the chambers $h$ and $w$, all as shown in Fig. 2. The two chambers $h$ and $w$ are separated from one another by a transverse partition $r$. The chamber $w$ has one or more drip-outlet openings $s$. A shaft G, which has its bearings in the upper part of the valve-box, carries three blades H, I, and J, which blades are disposed with reference to the valve-chambers in the following manner: The blade H is in contact with the partition $o$, the blade J in contact with the partition $p$, while the blade I is midway between these two partitions within the chamber $h$, but adapted to enter a pocket $t$, which is formed in the partition $r$, as shown in Fig. 2. By vibrating the shaft G with the aid of a handle L, which is affixed to one end of it, as in Fig. 4, the blades H, I, and J can be brought into the position shown by full lines in Figs. 1 and 2 or into a position indicated by dotted lines in Fig. 1, which will be hereinafter more fully described. The position shown in Fig. 2, it will be seen at a glance, is the position which cuts the heater or radiator entirely off the inlet and outlet pipes, because every avenue of communication between the inlet-pipes E B is intercepted by the valve-blade H and every avenue of communication between the outlet-pipes C F is intercepted by the valve-blade J, the blade I being at the same time at such a distance from the partition $r$ that a communicating passage $u$ is established between the nipples $i$ $j$, so that the main inlet-pipe E is in communication with the main outlet-pipe F. At the same time the radiator proper will discharge its contents through the pipes B C, or either of them, apertures $m$ $n$, or either of them, into the chamber $w$, whence they will drip or flow off through the aperture or apertures $s$, thus emptying the heater. By turning the shaft G the valve-blades H J can be brought into the other position, which is indicated by dotted lines in Fig. 1, so that they will close the openings $m$ $n$ and open the apertures $k$ $l$, and at the same time the valve-blade I will be partly received into the pocket $t$, so as to close the passage $u$ and divide the chamber $h$ into two parts, the consequence of which will be that the inlet-pipe E and its nipple $i$ will communicate, by means of the aperture $k$, with the chamber $f$, nipple $d$, and inlet-pipe B with the radiator, while in turn the radiator, by its outlet-pipe C, will discharge freely into the nipple $e$, chamber $g$, through the aperture $l$, into the nipple $j$ and main discharge-pipe F. Meanwhile the chamber $w$ is entirely cut out and the direct communication between the two nipples $i$ $j$ intercepted by the blade I.

I prefer to place the blades H and J upon the shaft G with the aid of groove and feather, so that said blades may have a slight longitudinal play on the shaft, which play would permit the employment of a screw M for drawing these blades tightly against the partitions $o$ $p$ after they have been set into the desired position; but this, being a mere matter of detail, does not constitute part of the present invention.

In case the chamber D is placed vertically, so that the compartment $f$ is above $g$ the apertures $s$ in the compartment $w$ can be dispensed with and in their stead one or more drip-openings placed in the bottom of compartment $g$, and the same closed when not used by a suitable valve or valves operated from shaft G, as shown by dotted lines $x$ in Fig. 2.

What I claim, and desire to secure by Letters Patent, is—

1. The combination of the heating apparatus A and its inlet and outlet pipes B C with the main inlet and outlet pipes E F and with an intermediate valve-box D, having chambers $f$, $g$, $h$, and $w$ and apertures connecting said chambers, as described, and with the shaft G, having valve-blades H I J, all as and for the purpose specified.

2. The combination of a radiator and its inlet and outlet pipes E F with a three-blade valve operating in a valve-box D, as described, one blade of said valve being capable of serving as a partition between said pipes, all arranged so that said valve will either establish direct communication between the inlet and outlet pipes E F by withdrawing said partition-blade from between said pipes, leaving the radiator connected with a drip, or shut out the drip by the other blades and connect the radiator directly with said inlet and outlet pipes, respectively, by separating said pipes E F by said partition-blade, leaving the other blades out of the way of a free communication between the said pipes and said radiator, substantially as and for the purpose specified.

3. The valve-chamber D, combined with the nipples $d$ $e$ $i$ $j$ and provided with the partition $o$, having openings $k$ $m$, partition $p$, having openings $l$ $n$, partition $r$, having pocket $t$, so as to form chambers $f$ $g$ $h$ $w$, one of said chambers having drip or outlet opening, and with the shaft G, having valve-blades H I J, all arranged for operation substantially as and for the purpose herein shown and described.

GEORGE HILL.

Witnesses:
HARRY M. TURK,
E. L. SHERMAN.